United States Patent Office 2,768,970
Patented Oct. 30, 1956

2,768,970

PHENYL STYRYL KETONE THIOSEMI-CARBAZONES

Hans Schmidt, Wuppertal-Vohwinkel, Robert Behnisch, Wuppertal-Sonnborn, and Ernst Schraufstatter, Wuppertal-Elberfeld, Germany, assignors to Schenley Industries, Inc., New York, N. Y., a corporation of Delaware No Drawing. Application February 18, 1954,
Serial No. 411,264

Claims priority, application Germany July 6, 1950

3 Claims. (Cl. 260—552)

The present invention relates to novel organic chemical compounds of a chemotherapeutic nature. More particularly, the invention contemplates the provision of a novel group of phenyl styryl ketone thiosemicarbazones which, preferably, have one or more substituents on the benzene nucleus of the styryl moiety, and which are characterized by their antiarthritic activity.

This application is a continuation-in-part of our copending U. S. application Serial No. 235,391 filed July 5, 1951, entitled "Chemical Compounds and Process For Preparing the Same" (now abandoned).

Heretofore, various aromatic thiosemicarbazones have been investigated and tested in the treatment of arthritis such as reported by Heilmeyer in Verhandlungen der Deutschen Gesellschaft für Innere Medizin, 1951, page 463, "The Cortisone-like Action of Thiosemicarbazones," and by Kuhlman, ibid. page 469, "The Endocrine Mechanism of Action of the Thiosemicarbazones on Chronic Arthritis." As a result of these investigations and other investigations conducted with known compounds of the thiosemicarbazone series for determining their efficacy against pathogenic microorganisms that cause tuberculosis, it has been found that the aldehyde thiosemicarbazones have the strongest inhibitory effect, whereas the ketone thiosemicarbazones have been found, in general, to be less effective or even ineffective and essentially more toxic than the aldehyde substituted compounds of the general class described.

We have found that the specific class of novel ketone thiosemicarbazones herein described constitute an exception to the aforementioned findings of prior investigators, in that, these compounds are high effective against arthritis. This new class of compounds consists of the thiosemicarbazones of phenyl styryl ketones which may have one or more therapeutically activating substituents on the benzene nucleus of the styryl moiety, as for example, substituents such as halogen, alkanoylamino, alkylamino, alkoxy, aryloxy, acyloxy, nitro, carboxy, carboxyalkoxy and alkylsulfonyl groups. The benzene nucleus of the styryl moiety may bear one or more of these substituents, and, when more than one substituent is employed, they may be alike or combinations of two or more dissimilar substituents.

This new class of compounds may be represented by the formula:

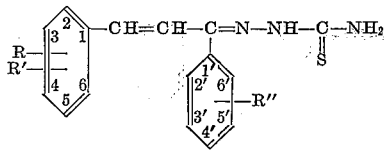

wherein R and R' are members of the group consisting of hydrogen, methyl, phenoxy, short-chain alkoxy comprising at most 4 carbon atoms, allyloxy, halogen, di-methylamino, acetylamino, nitro, acetoxy, ethylsulfonyl ($C_2H_5SO_2$), carboxy, carboxyvinyl and carboxymethoxy groups and R" is a member of the group consisting of methyl, methylmercapto, methoxy, halogen and carboxy groups and hydrogen.

The compounds of this class may be prepared following the procedure generally employed for producing thiosemicarbazones as by reacting thiosemicarbazide upon the selected ketone. Catalysts may be employed if necessary. Also, the substituent groups may be exchanged for other substituent groups on preformed thiosemicarbazones by known methods.

In order to facilitate a better understanding of this invention, the following examples are provided illustrating the manner of producing a number of representative thiosemicarbazones of the class. It is to be understood that these examples are not intended to impose any limitations on the invention, except as defined in the claims.

Example 1

Preparation of the compound represented by the formula:

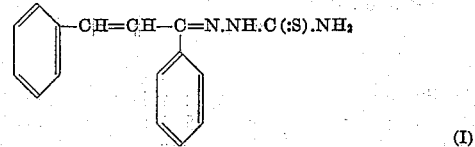

About 10.4 grams of benzalacetophenone and 4.5 grams of thiosemicarbazide are boiled in 500 cc. of ethyl alcohol for 12 hours. After distilling off the alcohol, the solution is boiled with ligroin and the residue recrystallized from 75% ethyl alcohol. The benzalacetophenone thiosemicarbazone thus obtained melts at 143° C.

In the same manner, by replacing the benzalacetophenone with 4-methylbenzalacetophenone, the reaction product, 4-methylbenzalacetophenone thiosemicarbazone of the melting point 154° C., was obtained. This compound is represented by the formula:

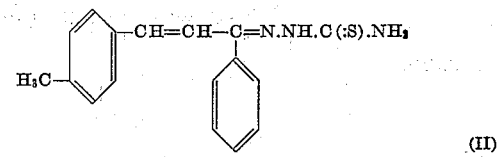

Example 2

The preparation of the compound represented by the formula:

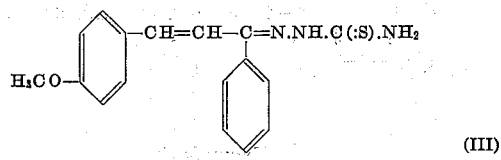

Approximately 12 grams of 4 - methoxy-benzalacetophenone and 4.5 grams of thiosemicarbazide are boiled in 500 cc. of ethyl alcohol for 12 hours, then 100 cc. of water are added. The solution is filtered off and allowed to crystallize, yielding the product 4-methoxy-benzalacetophenone thiosemicarbazone, which, after being recrystallized from 75% ethyl alcohol, melts at 142° C.

By recrystallizing from glacial acetic acid an isomer is recovered having a melting point of 190° C.

Example 3

Preparation of the compound represented by the formula:

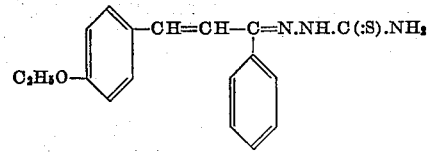

(IV)

12.6 grams of 4-ethoxychalcone and 4.5 grams of thiosemicarbazide are refluxed for 48 hours in 500 cc. of ethanol. The alcohol is then evaporated, the residue boiled with ligroin and recrystallized from aqueous ethanol (20:80). The ethoxybenzalacetophenone thiosemicarbazone thus obtained melts at 157° C. The same compound is obtained by boiling 25.2 grams of 4-ethoxychalcone and 9.1 grams of thiosemicarbazide in a mixture of 50 cc. of glacial acetic acid and 50 cc. of ethanol for two hours.

In the same manner we obtained: 4-n-propoxybenzalacetophenone thiosemicarbazone (melting point 164° C.) from 4-n-propoxybenzalacetophenone (melting point 59° C.). This compound is represented by the formula:

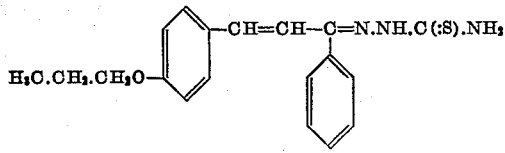

(V)

In like manner 4-allyloxybenzalacetophenone thiosemicarbazone (melting point 159° C.) from 4-allyloxybenzalacetophenone (melting point 66° C.), a compound represented by the formula:

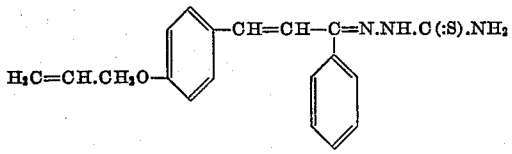

(VI)

4-n-butoxybenzalacetophenone thiosemicarbazone (melting point 150° C.) from 4-n-butoxybenzalacetophenone (melting point 64° C.), a compound represented by the formula:

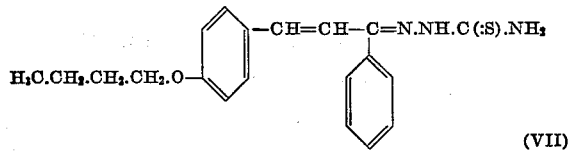

(VII)

and 4-phenoxybenzalacetophenone thiosemicarbazone (melting point 171° C.) from 4-phenoxybenzalacetophenone (melting point 94° C.), a compound represented by the formula:

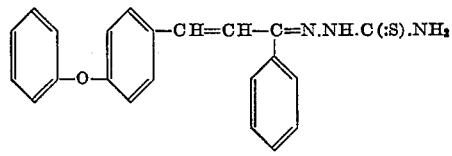

(VIII)

Example 4

Preparation of a compound represented by the formula:

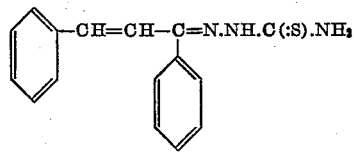

(IX)

12 grams of 3-methoxybenzalacetophenone and 4.5 grams of thiosemicarbazide are refluxed for 48 hours in 500 cc. of ethanol. The alcohol is then distilled off, the residue boiled with ligroin and recrystallized from ethanol/water 75:25. The resulting 3-methoxybenzalacetophenone thiosemicarbazone melts at 146° C. In the same manner the following compounds were obtained: by substituting 2-methoxybenzalacetophenone for the 3-methoxybenzalacetophenone, the product obtained is 2 - methoxybenzalacetophenone thiosemicarbazone (melting point 174° C.) and by replacing the 3-methoxybenzalacetophenone with 3:4-dimethoxy-benzalacetophenone, the product obtained is 3:4-dimethoxy-benzalacetophenone thiosemicarbazone (melting point 165° C.), represented, respectively, by the formulae:

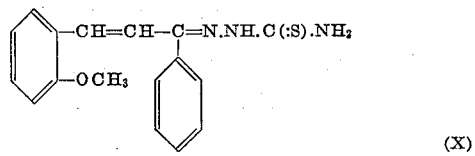

(X)

and

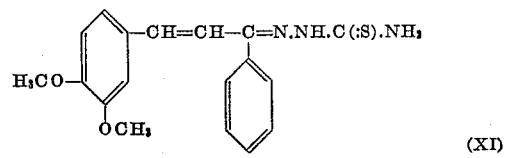

(XI)

Example 5

Preparation of the compound represented by the formula:

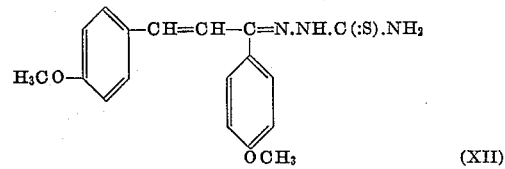

(XII)

13.4 grams of 4:4'-dimethoxybenzalacetophenone were refluxed for 48 hours with 4.5 grams of thiosemicarbazide in 500 cc. of ethanol. After distilling off the alcohol the residue was boiled with ligroin and then with water. It was recrystallized from ethanol. The 4:4'-dimethoxybenzalacetone thiosemicarbazone melts at 180° C.

In the same manner, by replacing the 4:4'-dimethoxybenzalacetophenone with 4'-methoxybenzalacetone, the product obtained is 4'-methoxybenzalacetone thiosemicarbazone (melting point 286° C.), a compound represented by the formula:

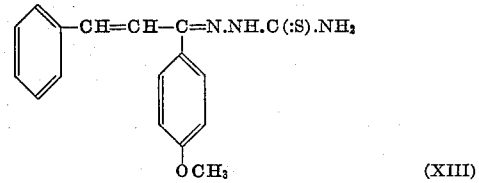

(XIII)

by replacing the 4:4'-dimethoxybenzalacetophenone with 4-methoxy-4'-methylbenzalacetophenone, the product obtained is 4-methoxy-4'-methylbenzalacetophenone thiosemicarbazone (melting point 199° C.), a compound represented by the formula:

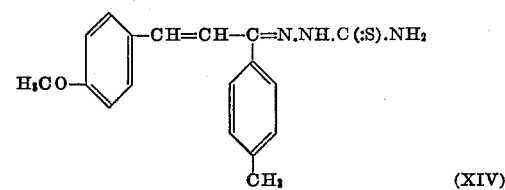

(XIV)

and, by replacing the 4:4'-dimethoxybenzalacetophenone with 4-methoxy-4'-chlorobenzalacetophenone, the product obtained is 4-methoxy-4'-chlorobenzalacetone thiosemicarbazone (melting point 217° C.), a compound represented by the formula:

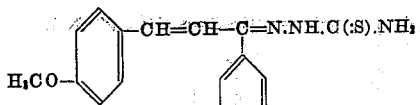

(XV)

Example 6

Preparation of the compound represented by the formula:

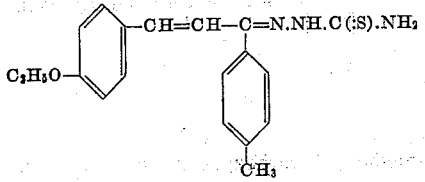

(XVI)

13.3 grams of 4-ethoxy-4'-methylbenzalacetophenone (melting point 99° C. obtained from 4-methyl-acetophenone and 4-ethoxybenzaldehyde) and 4.5 grams of thiosemicarbazide were refluxed for 48 hours in 500 cc. of ethanol. The alcohol is distilled off, the residue boiled with ligroin and recrystallized from alcohol/water 80:20. The 4-ethoxy-4'-methylbenzalacetophenone thiosemicarbazone recovered melts at 155° C.

Example 7

Preparation of a compound represented by the formula:

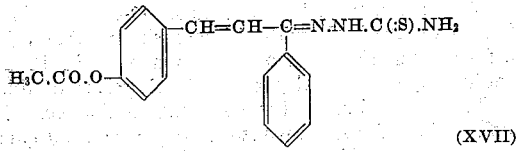

(XVII)

13.3 grams of acetoxybenzalacetophenone and 4.5 grams of thiosemicarbazide were refluxed for 48 hours in 500 cc. of ethanol. The reaction mixture is poured into water, the precipitate separated by suction filtration, dried, and boiled with ligroin. The residue is recrystallized from aqueous alcohol 20:80. The 4-acetoxybenzalacetophenone thiosemicarbazone melts at 186° C. It may be converted into 4-hydroxybenzalacetophenone thiosemicarbazone (melting point 244° C.) by heating for a short time in 2n-caustic soda solution.

Example 8

Preparation of a compound represented by the formula:

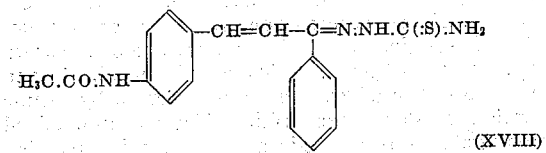

(XVIII)

About 13.3 grams of 4-acetylamino-benzalacetophenone and 4.5 grams of thiosemicarbazide are boiled in 500 cc. of ethyl alcohol for 12 hours, then 100 cc. of water is added and the solution is filtered off and allowed to crystallize. The product, 4-acetylamino-benzalacetophenone thiosemicarbazone, after being recrystallized from 75% ethyl alcohol, melts at 205° C.

Example 9

Preparation of a compound represented by the formula:

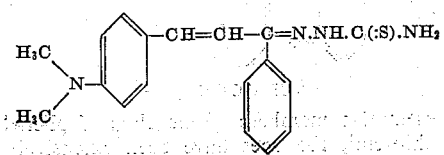

(XIX)

Approximately 12.6 grams of 4-dimethylamino-benzalacetophenone and 4.5 grams of thiosemicarbazide are boiled in 500 cc. of ethyl alcohol for 48 hours, then, after distilling off the ethyl alcohol, unreacted starting material is removed by extracting with some benzene or by boiling with water and the residue is recrystallized from alcohol. The product, 4-dimethylamino-benzalacetophenone thiosemicarbazone thus obtained melts at 163° C.

Example 10

Preparation of a compound represented by the formula:

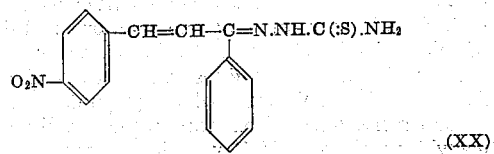

(XX)

12.6 grams of 4-nitrobenzalacetophenone and 4.5 grams of thiosemicarbazide are refluxed for 72 hours in 700 cc. of ethanol. 300 cc. of water are added and the mixture left to crystallize. The crystals are boiled with benzene and then with water. The residue is recrystallized from ethanol and then has the melting point 185° C. It is 4-nitrobenzalacetophenone thiosemicarbazone.

Example 11

Preparation of a compound represented by the formula:

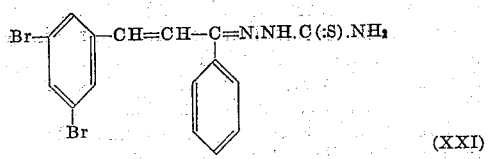

(XXI)

About 18.3 grams of 3:5-dibromo-benzalacetophenone (melting at 133° C., which may be prepared by reacting 3:5-dibromo-benzaldehyde with acetophenone in an alcoholic alkali solution) and 4.5 grams of thiosemicarbazide are boiled under reflux in 500 cc. of ethyl alcohol for 48 hours. After distilling off the ethyl alcohol, unreacted starting material is removed with boiling ligroin and the residue of 3:5-dibromo-benzalacetophenone thiosemicarbazone is recrystallized from alcohol. The product thus obtained melts at 227° C.

In the same manner, by replacing the 3:5-dibromo-benzalacetophenone with 4-chlorobenzalacetophenone, the product obtained is 4-cholorbenzalacetophenone thiosemicarbazone (melting point 164° C.), a compound represented by the formula:

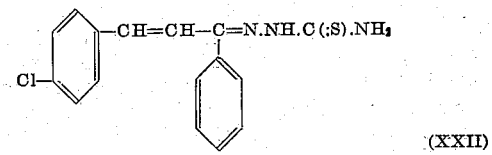

(XXII)

and by replacing the 3:5-dimethoxybenzalacetophenone with 4-methoxy-4'-bromobenzalacetophenone, the product obtained is 4-methoxy-4'-bromobenzalacetophenone thiosemicarbazone (melting point 223° C., a compound represented by the formula:

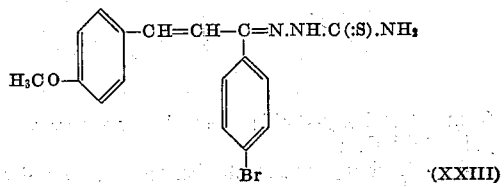

(XXIII)

Example 12

Preparation of a compound represented by the formula:

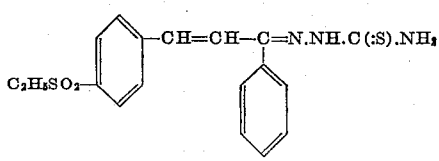

(XXIV)

Approximately 15 grams of 4-ethylsulfonyl-benzalacetophenone (melting at 145° C., which may be prepared by reacting 4-ethylsulfonyl-benzaldehyde with acetophenone in an alcoholic alkali solution) and 4.5 grams of thiosemicarbazide are boiled in 500 cc. of ethyl alcohol for 12 hours. The thiosemicarbazone of 4-ethylsulfonyl-benzalacetophenone which precipitates is filtered off and recrystallized from ethyl alcohol, yielding a product which melts at 211° C. with decomposition.

Example 13

Preparation of a compound represented by the formula:

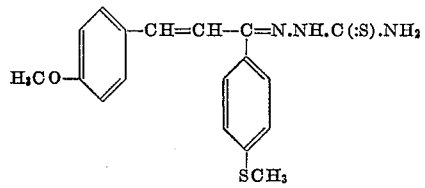

(XXV)

14.2 grams of 4-methoxy-4'-methylmercaptobenzalacetophenone (melting point 132° C., obtained from 4-methylmercaptoacetophenone and 4-methoxybenzaldehyde) and 4.5 grams of thiosemicarbazide are refluxed for 72 hours in 500 cc. of ethanol. After distilling off the alcohol, the residue is extracted with a little benzene and recrystallized from aqueous ethanol 20:80. The resulting 4-methoxy-4'-methylmercaptobenzalacetone-thiosemicarbazone melts at 155° C.

Example 14

Preparation of a compound represented by the formula:

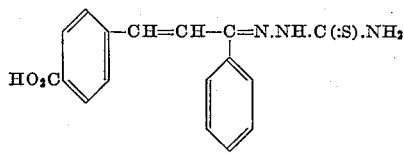

(XXVI)

About 12.6 grams of 4-carboxybenzalacetophenone (melting point 227° C., which may be prepared by reacting benzaldehyde-4-carboxylic acid with acetophenone in a 10% caustic soda solution) and 4.5 grams of thiosemicarbazide are refluxed in 500 cc. of ethyl alcohol for 48 hours. The thiosemicarbazone of 4-carboxybenzalacetophenone precipitates as yellow crystals which decompose when heated at 253° C. This product can be easily dissolved in aqueous mixtures containing alkanolamines, for instance, diethanolamine, with the formation of the alkanolamine (e. g. diethanolamine) salts.

In the same manner we obtained:

4-carboxy-4'-chlorobenzalacetophenone thiosemicarbazone (melting point 263° C.), a compound represented by the formula:

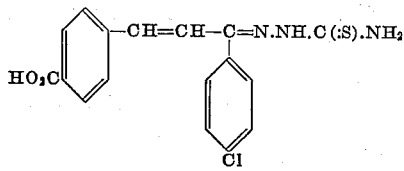

(XXVII)

from 4-carboxy-4'-chlorobenzalacetophenone (melting point 267° C.);

4' - carboxybenzalacetophenone thiosemicarbazone (melting point 224° C.), a compound represented by the formula:

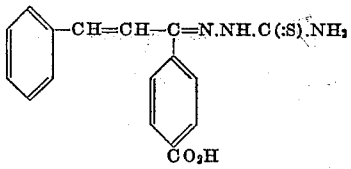

(XXVIII)

from 4'-carboxybenzalacetophenone, and 4-methoxy-4'-carboxybenzalacetophenone thiosemicarbazone (melting point 224° C.), a compound represented by the formula:

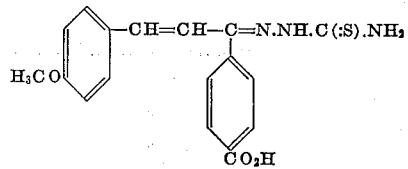

(XXIX)

from 4-methoxy-4'-carboxybenzalacetophenone.

Example 15

Preparation of a compound represented by the formula:

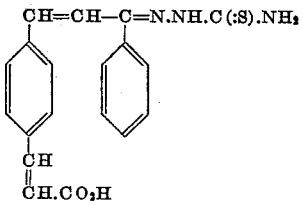

(XXX)

14 grams of benzalacetophenone-4-β-acrylic acid (melting point 250° C. with decomposition, obtained from 4-formylcinnamic acid and acetophenone in 10 percent sodium hydroxide solution) and 4.5 grams of thiosemicarbazide are heated for 96 hours in 500 cc. of ethanol. The thiosemicarbazone of benzalacetophenone-(4.β)-acrylic acid precipitates. It melts with decomposition at 258° C.

Example 16

Preparation of a compound represented by the formula:

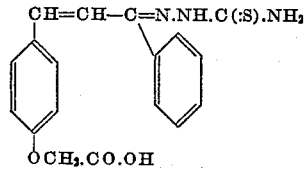

(XXXI)

14.1 grams of 4-carboxymethoxybenzalacetophenone (melting point 192° C. obtained from 4-formylphenoxyacetic acid and acetophenone in 10 percent sodium hydroxide solution) and 4.5 grams of thiosemicarbazide are refluxed for 48 hours in 500 cc. of ethanol. 100 cc. of water are then added, the solution cleared by suction filtration and stored to crystallize. The crystals obtained are recrystallized from acetic acid. The thiosemicarbazone of 4-carboxymethoxybenzalacetophenone melts at 208° C. with decomposition.

In an analogous manner 3-carboxymethoxybenzalacetophenone (melting point 137° C.) yields a thiosemicarbazone, which, after being recrystallized from ethanol/water 60:40, melts at 181° C. with decomposition. This product is a compound represented by the formula:

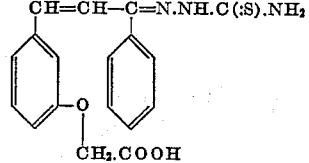

Representative members of the class of phenyl styryl ketone thiosemicarbazones have been extensively tested for their antiarthritic activity in controlled animal tests. Clinical trials have also been made on representative members of the class such as 4-ethoxy-benzaldehyde-acetophenone thiosemicarbazone, in which these compounds have proven to be effective in combating arthritis.

In some of the animal tests, using rats as the test animals, the antiarthritic effectiveness of the new thiosemicarbazones has been compared with that of anisalacetone thiosemicarbazone. Two representative compounds of the new class were selected for this comparison these being 4-methoxybenzalacetophenone thiosemicarbazone (Example 2) and 4-ethoxybenzalacetophenone thiosemicarbazone (Example 3). The antiarthritic activities of the compared compounds were evaluated by counting the blood eosinophils and lymphocytes following intraperitoneal injections of the substances at dosage levels of 20 milligrams per kilogram of body weight, with the results given in the following table expressed as activity quotients:

| Compound | Eosinophils | Lymphocytes |
|---|---|---|
| anisalacetone thiosemicarbazone | 1.0 | 1.0 |
| 4-methoxybenzalacetophenone thiosemicarbazone | 4.0 | 2.1 |
| 4-ethoxybenzalacetophenone thiosemicarbazone | 8.1 | 2.3 |

In further more extensive animal tests also using rats as the test animals a number of the new compounds were tested and evaluated for their effectiveness on the basis of the effect of cortisone in identical tests. These tests were divided into three sections: (a) Tests for Eosinophile quotient and Lymphocyte quotient following an experimental procedure approximating that of A. E. Heming et al. (Journal of Pathology and Experimental Therapeutics 106 : 271, 1952). Here it may be noted that the activity of the compounds becomes interesting when the activity quotient of the eosinophils is higher than 4 and that of the lymphocytes is higher than 1.5. (b) Tests for effectiveness against arthritic stress induced by injection of undiluted chicken egg white and termed for identification "Protein Arthritis." A group of at least five animals was used for average evaluation of each preparation, the procedure used being that of L. Heilmeyer, F. Frey and R. Fischer, Archiv für Experimentell Pathologie und Pharmakologie 213 : 387, (1951). (c) Tests for effectiveness against arthritic stress induced by subplantary administration of formaldehyde and termed for identification "Selye Arthritis." The average reaction of groups of at least five animals was evaluation. The procedure of at least the recommendations of Selye in The British Medical Journal (1949): 1129.

The results of these three groups of tests are summarized in the following table:

| | Eosinophile Quotient | Lymphocyte Quotient | Selye Arthritis | Protein Arthritis |
|---|---|---|---|---|
| (1) 4-methoxybenzalacetophenone thiosemicarbazone | good 5.1 | very good 2.2 | good effect | no test. |
| (2) 4-acetoxybenzalacetophenone thiosemicarbazone | very good 8.3 | poor 1.0 | do | moderate effect. |
| (3) 4-allyloxybenzalacetophenone thiosemicarbazone | good 5.4 | good 1.7 | do | very good effect. |
| (4) 4-n-propoxybenzalacetophenone thiosemicarbazone | good 5.7 | very good 1.9 | do | good effect. |
| (5) 4-ethoxybenzalacetophenone thiosemicarbazone | very good 7.6 | very good 2.1 | do | very good effect. |
| (6) 3-methoxybenzalacetophenone thiosemicarbazone | good 4.8 | good 1.6 | good | no test. |
| (7) 3,4-dimethoxybenzalacetophenone thiosemicarbazone | very good 10.1 | good 1.6 | do | Do. |

Having thus described the subject matter of the invention with reference to specific examples, what is desired to secure by Letters Patent is:

1. A chemotherapeutic compound represented by the formula:

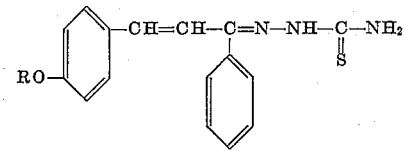

wherein R is a member of the group consisting of hydrogen, and short chain alkyl radicals containing at most four (4) carbon atoms.

2. A chemotherapeutic compound as claimed is claim 1 wherein R is methyl.

3. A chemotherapeutic compound as claimed in claim 1 wherein R is ethyl.

References Cited in the file of this patent
UNITED STATES PATENTS

| 2,676,978 | Schmidt et al. | Apr. 27, 1954 |
| 2,683,171 | Schmidt et al. | July 6, 1954 |

FOREIGN PATENTS

| 584,371 | Great Britain | Jan. 14, 1947 |

OTHER REFERENCES

Sah et al.: "Rec. Trav. Chim.," vol. 69 (1950), pp. 1554, 1547.